United States Patent [19]
Bendel et al.

[11] Patent Number: 5,569,025
[45] Date of Patent: Oct. 29, 1996

[54] LEAK-PROOF ABS/TCS PUMP ASSEMBLY WITH NON-RETURN VALVE

[76] Inventors: Klaus Bendel, Taunusstrasse 35d, 65830 Kriftel; Jurgen Uhlmer, Blutenweg 14, 63768 Hosbach; Armin Eiser, Gartenstrasse 10, 35519 Rockenberg, all of Germany

[21] Appl. No.: 256,816
[22] PCT Filed: Nov. 13, 1993
[86] PCT No.: PCT/EP93/03185
  § 371 Date: Nov. 3, 1994
  § 102(e) Date: Nov. 3, 1994
[87] PCT Pub. No.: WO94/12375
  PCT Pub. Date: Jun. 9, 1994

[30] Foreign Application Priority Data

Nov. 24, 1992 [DE] Germany .......................... 42 39 361.2

[51] Int. Cl.⁶ .................. F04B 21/00; B60T 8/40
[52] U.S. Cl. ................................................. 417/434
[58] Field of Search ........................... 417/364, 434

[56] References Cited

U.S. PATENT DOCUMENTS

| | | | |
|---|---|---|---|
| 2,181,898 | 12/1939 | Kastler | 417/434 |
| 4,298,314 | 11/1981 | Thayer | 417/434 X |
| 4,871,303 | 10/1989 | Roesler | 417/434 |
| 5,249,935 | 10/1993 | Burgdorf | 417/415 |

*Primary Examiner*—Richard E. Gluck

[57] ABSTRACT

A pump assembly for a controlled brake system diverts pressure fluid entrained by the pistons which collects in the space around the eccentric to prevent it from becoming pressurized by the moving pistons. A non-return valve inserted into an exit duct is dimensioned such that it opens when exposed to the pressure of the collected pressure fluid, and prevents the ingress of dirt and moisture in the opposite direction.

7 Claims, 2 Drawing Sheets

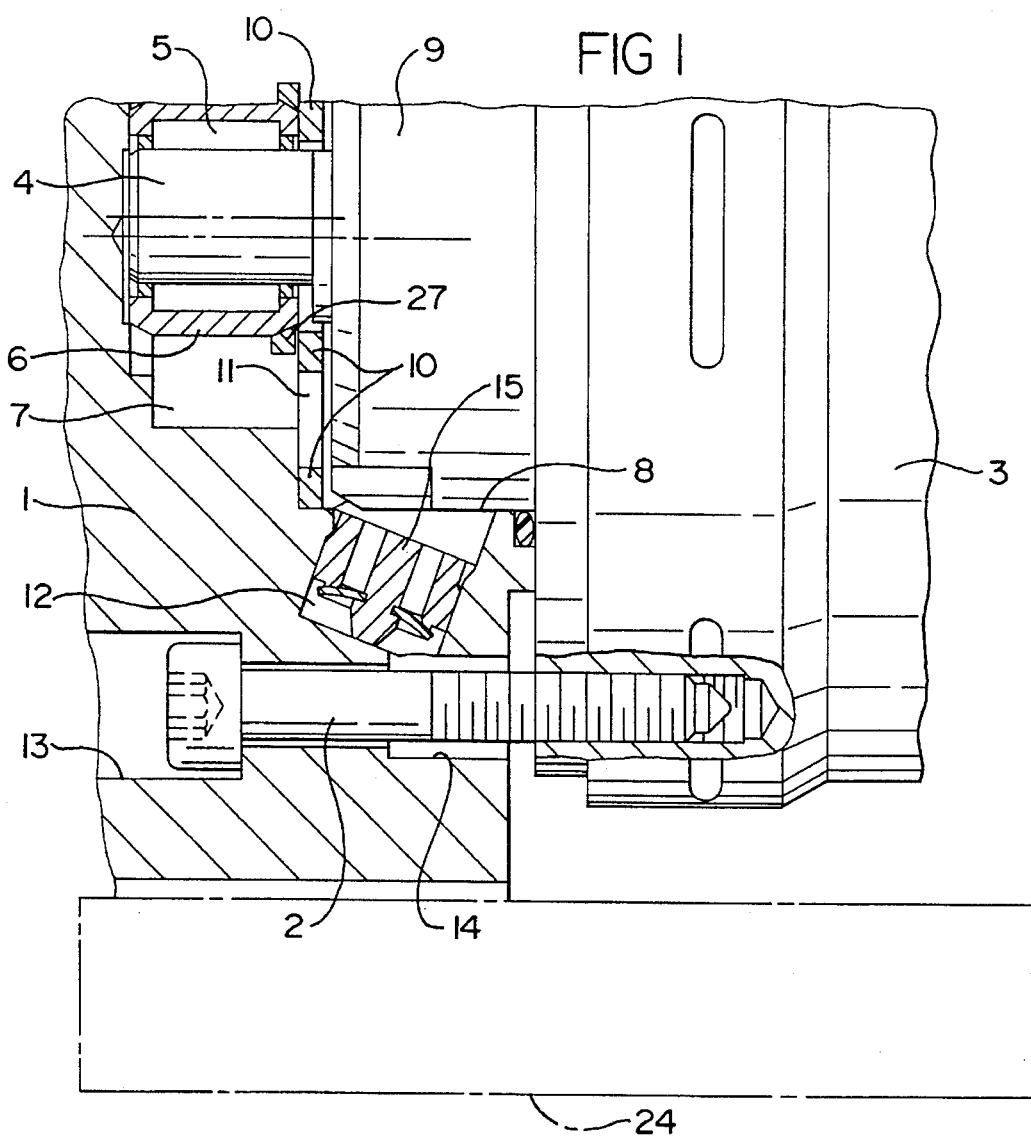
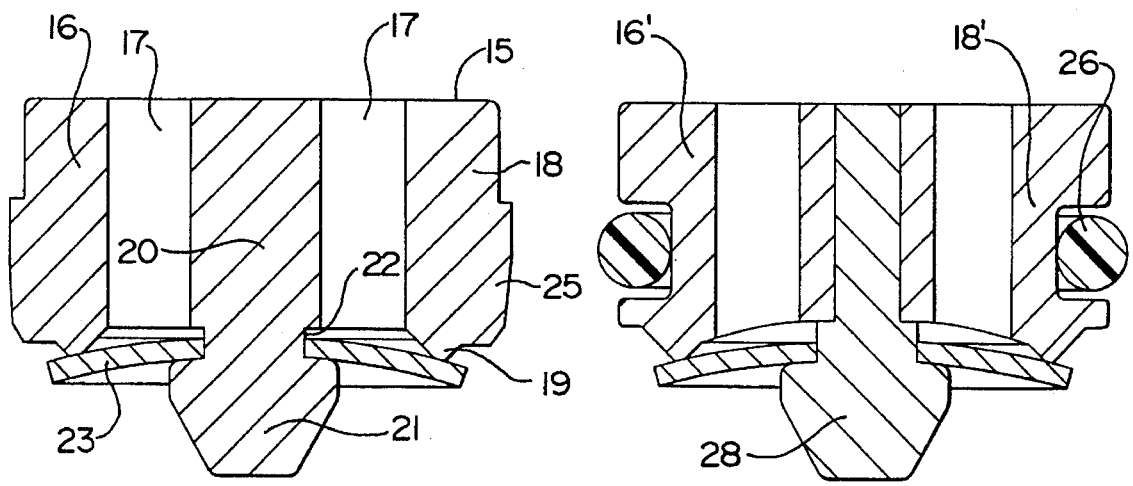

2,569,025

LEAK-PROOF ABS/TCS PUMP ASSEMBLY WITH NON-RETURN VALVE

TECHNICAL FIELD

The present invention relates to a pump assembly for a controlled brake system for automotive vehicles and more particularly to an improved seal for such assemblies.

BACKGROUND OF THE INVENTION

Pumps used on ABS and TCS applications are generally known, for example, in U.S. Pat. No. 5,249,935 one such pump is described. In pumps of this type, inlet bores and outlet bores terminate into cylinders, and pressure fluid, controlled by valves, is supplied from the inlet bores to the outlet bores through pistons moving in the longitudinal direction of the cylinders. The pistons are driven by an electric motor through an eccentric, the drive chamber being sealed in relation to the compression space by the seals of the pistons.

In spite of the presence of the piston seals small quantities of pressure fluid are entrained by the moving surface of the pistons through the seals into the space surrounding the eccentric. Normally, atmospheric pressure is present in this space. The entrainment of small quantities of pressure fluid may gradually cause pressure fluid to accumulate in the ambient space of the eccentric, in which case the piston plunges into the accumulated pressure fluid. This plunging causes pressure pulsations. These pressure pulsations may urge pressure fluid into the inner space of the driving electric motor and eventually destroy it.

As a remedy, it has been suggested to provide a bore from the ambient space of the eccentric through the pump housing in order to impart an exit conduit to the introduced pressure fluid. However, such a connection is disadvantageous when the pump assembly is arranged in the automotive vehicle at a comparatively low level in respect of the road surface. It has to be expected in these cases that liquid from the road is carried into the connecting conduit and, subsequently, into the ambient space of the eccentric. The resulting contamination may rapidly destroy the very finely machined working surfaces of the eccentric and the pistons. Further, the ingress of liquid may eventually lead to the destruction of the electric motor by causing a short circuit. This applies in particular to vehicles from which it is demanded that they can pass through high water levels.

Therefore a primary object of the present invention is to render a pump assembly of this type reliably leak-proof by simple means.

The present invention achieves this objective by placing a non-return valve in the connecting conduit between the ambient space of the eccentric and the exit aperture of the pump housing, this non-return valve being arranged below the ambient space in the assembly position.

This way, it is possible to provide a discharge from the pump housing of the pressure fluid which bypassed the piston and collected in the ambient space, and to prevent the ingress of ambient fluid such as road liquids into the pump housing at the same time.

In order to reliably prevent the accumulation of entrained pressure fluid in the ambient space of the eccentric, it is preferable to use the accumulating pressure fluid itself to force the non-return valve to open.

A particularly reliable design of the non-return valve is achieved by using the force of gravity acting upon the quantity of accumulated pressure fluid to open the valve so that a damaging accumulation of pressure fluid will not occur.

To facilitate the mounting of the non-return valve and to better adapt the leak-proof capacity of a vehicle to the respective requirements, it is preferred that the valve member has a sealing edge engaging the pump housing.

A particularly simple structure of the non-return valve is made possible by the present invention in that no special means is needed for generating the preload on the piston seal. Instead, the presence of the seal in the valve housing and the characteristics of this seal itself ensure sufficient contact pressure on the sealing seat.

A fastening bore in the pump housing, which extends substantially horizontally in the installation position, is simultaneously utilized as an exit for the connecting conduit. As a result, the connecting conduit has a relatively narrow, angular course, a type of labyrinth being formed which, additionally, contributes to improving the present invention by preventing the direct ingress of spray water and dirt.

BRIEF DESCRIPTION OF THE DRAWINGS

FIG. 1 is a section of a pump assembly according to the present invention.

FIG. 2 is an enlarged view of the non-return valve according to FIG. 1.

FIG. 3 is a modified embodiment of the non-return valve of FIG. 2.

DETAILED DESCRIPTION OF THE PREFERRED EMBODIMENTS

Figure 4:
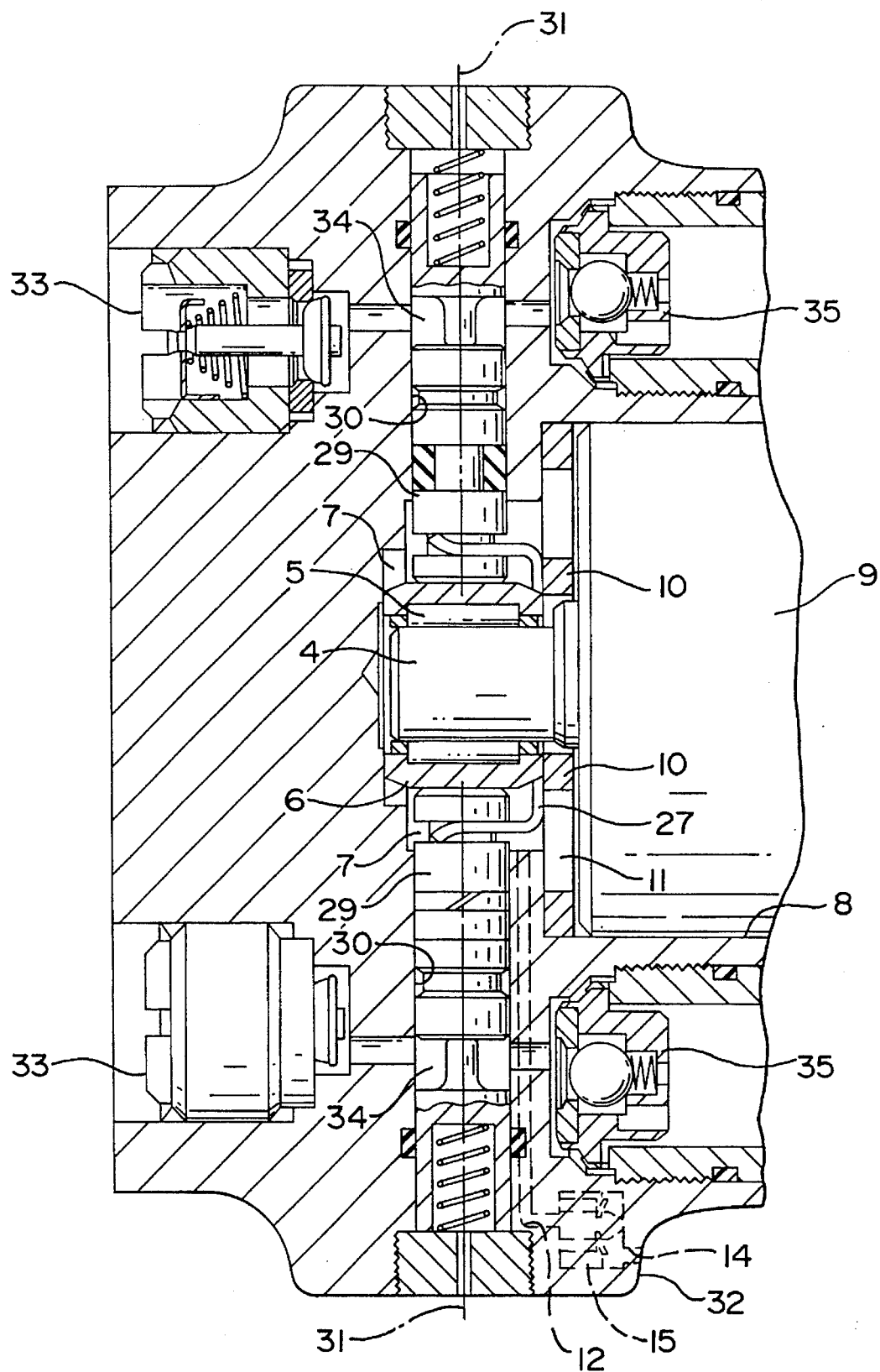
FIG. 4 is a sectional schematic view of the pump assembly at 90° to the view of FIG. 1.

In FIG. 1, a pump housing 1 is coupled to the casing 3 of an electric motor by means of assembly screws 2. An eccentric 4 projects from the motor casing 3 into the inner space 7 of the pump housing i. An external bearing ring 6, (which due to the effect of the eccentric 4 performs an eccentric movement), is seated on the eccentric 4. The ring 6 being rotatably mounted through a roller bearing 5 and being substantially unrotatable in relation to the pump housing 1. The bearing ring 6 acts upon the feet of two opposed pistons shown in FIG. 4 which are guided in cylinders 30 in the pump housing 1 being arranged perpendicular to the drawing plane of FIG. 1, as shown in FIG. 4. Respective details can be taken from the previously mentioned U.S. Pat. No. 5,249,935. The external bearing ring 6 and, thus, the eccentric 4 move in an ambient space 7 alternatively identified as a first compartment, or a nonworking chamber, in the interior of the pump housing 1 which surrounds the eccentric 4.

Further, a cylinder-shaped accommodating opening 8 can be seen in FIG. 1 which accommodates a front portion 9 of the electric motor projecting into the pump. At the bottom end of the external bearing ring 6, a return ring 27 (shown in cross-section) can be seen which is coupled to the two pistons 29 and returns them from their extreme position in the direction responsive to rotation of eccentric 4 of the eccentric axis 31. It is important for the present invention that, in the installation position, the pump housing is arranged such that the illustrated assembly screw 2 with the exit aperture 14 is disposed at the bottom end of the housing.

Accordingly, the pistons move in horizontal direction (i.e. along an axis perpendicular to the plane of FIG. 1).

The pressure fluid which is entrained by the pistons moving in the cylinders in the direction of the eccentric collects at the bottom end of the space 7. From there, it can enter through apertures 11 in the thrust washer 10 into the accommodating opening 8 which is closed by the flanged electric motor 3. Through an inclined connecting bore 12, the accommodating opening 8 is connected with a stepped bore 13 which extends in horizontal direction. The stepped bore 13 includes a guide portion for guiding the assembly screw 2 and an aperture 14, which is extended in relation to the guide portion and, together with the assembly screw 2, forms an annular chamber passing to an outside 32 of the pump housing 1. The phantom line representation of connecting bore 12 in FIG. 4 is merely schematic, showing that bore 12 enables fluid to exit ambient space 7.

A non-return valve 15 is inserted into the connecting bore 12 which is described in more detail with respect to FIG. 2. Fluid entering into the ambient space 7, is routed to aperture 14 by way of a connecting conduit defined by aperture 11, the accommodating opening 8, the valve 15 in the connecting bore 12 and the guiding aperture 14 in the housing 1. As indicated in phantom lines, a valve block 24 can be arranged below the housing which, in addition to its primary function, also impedes the ingress of spray water into the connecting conduit in the pump housing 1.

FIG. 2 shows a first embodiment of non-return valve 15. Several ducts 17 are formed in a valve housing 16. The external annular area 18 of the valve housing 16 includes a circumferential projecting bead 19, the outer edge of which forms the stationary valve seat. The mid-portion 20 of the valve housing 16 carries a mushroom-shaped projection 21, at the housing-side end of which a groove 22 is provided. The inner edge of a rubber-made seal 23 engages into this groove and, with its outer area, is seated annularly on a sealing edge of the bead 19. The position of the groove 22 in relation to the sealing edge at the housing is offset in such a manner that the seal 23 becomes curved and, thus, abuts with preload on the sealing edge. The amount of the preload is predetermined by the degree of curvature, the material composition of the rubber and the strength of the seal. All of these factors are balanced such that under the weight, and thus the pressure, of a sufficient quantity of accumulated pressure fluid, the ring seal 23 lifts from the sealing edge of bead 19 and permits discharge of the fluid. After the discharge of the pressure fluid, the valve closes again due to the elasticity of the seal 23.

FIG. 2 shows an annular projection 25 which extends over only part of the height of the housing 16. The purpose of this projection is to facilitate pressing the housing 15 into the connecting bore 12 of the pump housing 1 so as to seal and, thus, to better adapt the outer contour of the sealing housing 16 to the peripheral surface of the connecting bore 12.

FIG. 3 shows a modified embodiment which differs from FIG. 2 in that an 0-ring 26 made of rubber, instead of the circumferential projection 25, is arranged in a corresponding groove FIG. 4 shows a more complete sectional view of the pump consistent with the configuration of the pump in U.S. Pat. No. 5,249,935. Opposed pistons 29 reciprocate within bores 30 along axis 31 responsive to rotation of eccentric 4.

Fluid inlet valves 33 are disposed in a fluid path between input ports supplying pressure fluid and working chambers 34 located within cylinders 30 opposite bearing ring 6. Fluid exhaust valves 35 are disposed in a fluid path between the working chambers 34 and output ports. FIG. 4 is a schematic drawing of the pump housing, and is provided to show how the pump elements are connected to each other. It is not intended to be an accurate representation of exactly where the parts would be found in the present pump. For example, fluid exhaust valves 35 would be located elsewhere so as not to overlap the casing 3 of the motor in the housing 16'.

The valve housing 16' is composed of two parts for reasons of manufacture, that is the having an external annular area 18' and a valve pin 28 which is pressed into the valve housing 16.

We claim:

1. A pump and motor housing, comprising:

a housing having a first compartment receiving a pump eccentric for engaging pistons said housing having an aperture fluidly connecting the first compartment with an outside of the housing, said housing further including an input port and an output port, said ports connected to a working chamber of said pump thereby enabling said pump to move fluids from said input port to said output port of said housing, and a non-return valve disposed in the first aperture between the first compartment and the outside of the housing and configured to enable a flow of fluid out of the first compartment and through the aperture responsive to pressure within the first compartment and blocking a flow of fluid into the first compartment from the outside.

2. A pump assembly as claimed in claim 1, further including means for opening said non-return valve in response to the load exerted by a quantity of pressure fluid that escapes from said non-working chamber of said pump.

3. A pump assembly as claimed in claim 2, wherein said opening means opens in response to the weight exerted by the quantity of pressure fluid.

4. A pump assembly as claimed in claim 1, wherein the non-return valve is a complete unit inserted into said exit aperture, wherein said non-return valve includes a valve body and a seal, said valve body, preferably made of plastic having a sealing edge whereby said sealing edge abuts said seal when said seal is placed under preload.

5. A pump assembly as claimed in claim 4, wherein a preload is generated by the curving of the seal due to the plane of abutment of the seal with the sealing edge being offset in the direction of outlet of the pressure fluid in relation to the attachment of a ring seal to the sealing edge of valve body.

6. A pump assembly as claimed in claim 1, wherein the valve body is pressed into the exit aperture thereby effecting a fluid tight seal.

7. A pump assembly as claimed in claim 1, wherein the exit aperture is a through-bore in the outer wall of the first compartment said aperture accommodating an assembly screw and which extends substantially in a horizontal direction.

\* \* \* \* \*